United States Patent [19]
Gerry

[11] 3,859,665

[45] Jan. 7, 1975

[54] DISTORTIONLESS MAGNETIC HEAD USING INTEGRAL MECHANICAL FILTER MEANS

[76] Inventor: Martin E. Gerry, 13452 Winthrope St., Santa Ana, Calif. 92705

[22] Filed: June 25, 1973

[21] Appl. No.: 372,906

[52] U.S. Cl. .................................................. 360/125
[51] Int. Cl. .................................................. G11b 5/12
[58] Field of Search .............. 179/100.2 C, 100.2 K; 346/74 MC; 340/174 AG, 174.1 F; 360/113, 125, 126, 127

[56] References Cited

UNITED STATES PATENTS

| | | | |
|---|---|---|---|
| 2,539,876 | 1/1951 | Von Behren | 179/100.2 C |
| 3,048,666 | 8/1962 | Neville | 179/100.2 C |
| 3,651,282 | 3/1972 | Gerry | 179/100.2 C |

*Primary Examiner*—Raymond F. Cardillo, Jr.
*Assistant Examiner*—Robert S. Tupper

[57] ABSTRACT

A head for magnetic recording or reproducing purposes is disclosed wherein the magnetic structure includes mechanical filter configurations integral with the core structure relative thereto through which the main core flux is conducted. Magnetic discontinuities are provided in the overall core structure so that coils wound on the core structure are isolated from each other by such discontinuities. The results thus obtainable are deletion of harmonic components of the carrier frequency together with their distortion components and very substantial attenuation of the distortion compounds due to steady state sinusoidal intelligence. Cores without discontinuties are provided for attenuation of distortion when non-sinusoidal intelligence is used.

27 Claims, 22 Drawing Figures

DISTORTIONLESS MAGNETIC HEAD USING INTEGRAL MECHANICAL FILTER MEANS

INCORPORATION BY REFERENCE

U.S. Pat. No. 3,651,282 to the same inventive entity, and particularly the section thereof entitled "Amplitude Modulation in a Magnetic Structure with Analysis of Distortion Components," is incorporated by reference as if said matter had been fully set forth herein.

BACKGROUND OF THE INVENTION

This invention relates to a distortionless magnetic recording or reproducing head wherein the components comprising the head are integral portions of a mechanical filter.

No art is directly available in this field, the closest art being certain magnetic heads and certain mechanical filters, as follows:

U.S. Pat. No. 2,855,464 issued Oct. 7, 1958 for an Electromagnetic Head, discusses a number of configurations of flux responsive heads. All heads utilize many windings in complex arrangements, and attempt to obtain flux responsive characteristics by balanced windings. The heads also utilize means for saturating small portions of the magnetic cores.

U.S. Pat. No. 2,704,789 issued Mar. 22, 1955 for a Multi-Channel Flux Responsive Magnetic Reproducer Head Unit, shows a separate core on which is wound a coil for providing high frequency excitation current for creating a changing flux. The separate core used therefor intersects perpendicularly the core structure of the head. The excitation or separate core is attached to a group of individual cores on which signal coils are wound. The basic principle involved is the establishment of orthogonal relationships between the high frequency flux and the signal flux. This relationship results in permeability change at the point of intersection of the two cores, which allegedly prevents a voltage resulting from the high frequency excitation current from appearing across each recording gap of the individual cores.

U.S. Pat. No. 2,804,506 issued Aug. 27, 1957 for a Dynamagnetic Pick-Up System, which like U.S. Pat. No. 2,855,464, has complex windings within the core structure proper, obtained by drilling or stamping out holes in the flat portion of the core for the purpose of winding a coil about a narrow core portion, so that a small area of the core may have its reluctance changed according to the excitation frequency as well as magnetically saturating that small core area. U.S. Pat. No. 2,165,307 issued July 11, 1939, for a Means for Translating Magnetic Variations into Electric Variations, utilizes a magnetic core as an integral part of an electron beam tube. A gap in the magnetic circuit external to the beam tube picks off a signal from a tape which is translated in the gap. The magnetic flux path which acts as a deflecting means of the electron beam, terminates at one end of the beam tube within the vicinity of the beam. The voltage output from the tube which is thereby produced is proportional to the flux amplitude of the flux within the gap in which the tape is translated.

U.S. Pat. No. 3,573,671 issued Apr. 6, 1971, for Lattice-Type Filters Employing Mechanical Resonators Having a Multiplicity of Poles and Zeros, discloses a lattice-type filter with the series arm and crossarm impedances comprised of a multiresonant mechanical structure having a plurality of arrangeable poles and zeros. The multiresonant structure can comprise a plurality of disks with their axes lying along a common line. Coupling wires secured to the disk perimeters hold them in place and transmit energy. The input means is a coil wound on a magnetostrictive rod secured to an end disk.

U.S. Pat. No. 3,571,766 issued Mar. 23, 1971, for a Disk-Wire Mechanical Filter Using Bridging Wire to Achieve Attenuation Pole, discloses a general stopband disk-wire type mechanical filter having at least four circle mode vibration-type disks therein with a first coupling wire means connected to the perimeters of all four disks and a second coupling wire means connected only to the first and the fourth disk and bridging the two disks therebetween. The second bridging coupling wire means has a length such that it produces a 180° phase shift of energy transferred therethrough within the passband. Circle mode-type disks resonate in-phase with each other at the lower end of the passband and out-of-phase, with the adjacent disks, at the upper end of the passband. Consequently, the energy transfer through the bridging coupling wires is out-of-phase with the energy transfer through the first coupling wire means both at the lower and upper ends of the passband, thereby producing the general stopband characteristic.

U.S. Pat. No. 3,516,029 issued June 2, 1971 for Mechanical Filters Employing Multimode Resonators, discloses a mechanical filter of the stacked disk type employing multi-diameter mode type disks which have two diameter mode frequencies, one lying inside the passband and one lying just outside the passband. By proper positioning of the coupling wires there is produced an attenuation pole between the two frequencies. Two such multi-diameter mode disks can be employed to produce an attenuation pole near the lower edge of the passband and an attenuation pole near the upper edge.

U.S. Pat. No. 3,488,608 issued Jan. 6, 1970 for a General Stopband Mechanical Disc Filter Section Employing Multi-mode Discs, discloses a mechanical bandpass filter of the stacked disk type employing a multi-diameter mode type disk with appropriate coupling wire arrangement so that a single multi-diameter mode disk acts as two separate diameter mode type disks. The resultant filter has a twin-T topology and is capable of realizing a general stopband equal ripple passband amplitude response.

U.S. Pat. No. 3,440,572 issued Apr. 22, 1969 for a Mechanical Filter Section With Envelope Delay Compensation Characteristic, discloses a mechanical filter section having an inverted U-shaped group delay characteristic and comprising, first, second, third, and fourth circular mode disks arranged in a stacked relation in the order named with their axes lying along a common line and spaced apart a distance less than a half wavelength of their natural resonant frequency, and a plurality of wire-like coupling means extending along the stack of disks and secured to the perimeters of the disks to hold the disks in their relative positions. The second and third disks have segments removed at their perimeters. Wire-like bridging means are secured to the perimeters of the first disk and the fourth disk which also pass across the segmented portions of the second and third disks.

U.S. Pat. No. 3,440,574 issued Apr. 22, 1969 for a Mechanical Filter Having General Stopband Characteristics, discloses a mechanical filter structure comprising a diameter mode disk, a first circular mode disk, a second circular mode disk positioned between the diameter mode disk and the first circular mode disk and having a segment of the edge thereof removed. Provided, is a first coupling wire-like means secured rigidly to the perimeters of the diameter mode disk and the first and second circular mode disks to hold the disks in a fixed position with their axes lying along a common line and spaced apart a distance less than one-half wavelength of the natural resonant frequency of the disks. The coupling wire-like means is secured to the perimeter of the diameter mode disk at points all of which have a first phase of vibration.

U.S. Pat. No. 3,439,295 issued Apr. 15, 1969 for a Mechanical Filter With Attenuation Poles On Both Sides Of Passband, discloses a mechanical filter structure comprising a first plurality of disks comprising first, second, third, and fourth disks arranged in the order listed in a stacked position with their axes lying along a common line and spaced apart a distance less than half the wavelength of their natural resonant frequency. The first disk is a diameter mode type disk and the second, third, and fourth disks are circular mode type disks. First wire-like coupling means are provided extending along the stack of disks and secured to the perimeters thereof to hold the disks in the stacked arrangement. The first wire-like coupling means is secured to points on the perimeter of the diameter mode disk, and having a first phase of vibration. Second wire-like bridging means is secured to the first disk and the fourth disk and bridging across the second and third disks. The second wire-like bridging means is connected to a point on the perimeter of the first disk having a phase of vibration opposite to that of the first phase of vibration.

U.S. Pat. No. 3,351,875 issued Nov. 7, 1967 for a Ring Coupled Mechanical Filter, discloses mechanical filter means comprising a plurality of disks of the circular type mode of vibration spaced apart from each other and having their axes lie on a common center line. Coupling means are provided for coupling together adjacent disks, the coupling means each comprising a short, thin-walled tubular section of metallic composition with the axis thereof coincident with the common center line, the diameter of the tubular section being substantially equal to the diameter of a circular mode of the disks near the natural resonant frequency of the disks.

U.S. Pat. No. 3,142,027 issued July 21, 1964 for an Electromechanical Wave Filter Having Resonant Bars Coupled to Each Other By Torsion Wires Which Also Support Bars, discloses a filter for electric waves, comprising a plurality of mechanical resonators made in the form of bending oscillators, coupling members arranged between the resonators in the range of the oscillation modes thereof and interconnecting the resonators to form a self-sustaining unit. The material of the coupling members being small as compared with one-quarter wavelength and is effective to transmit torsional forces. The coupling members are each formed by a wire element which is common to the resonators. The wire element lies upon and is rigidly connected with each of the resonators, and having their free ends, one at one end of the filter, extending therefrom to form non-loading supporting means for the filter.

U.S. Pat. No. 3,135,933 issued June 2, 1964 for an "M" Derived Mechanical Filter, which discloses mechanical filter means comprising a plurality of first and second disks having substantially equal resonant frequencies. The disks are spaced apart and have their axes along a common straight line. First coupling rod means is provided for rigidly coupling adjacent disks, each of the second disks are segmented by having a portion of its mass removed to cause its equivalent mass to bear a ratio "m" to the equivalent mass of the first disks from which no mass has been removed. Bridging coupling rod means are provided for coupling together the disks on either side of each of the second disks from which a portion of its mass has been removed.

U.S. Pat. No. 2,918,634 issued Dec. 22, 1959 entitled, Increase of Coupling to Mechanical Filter End Disks to Improve Response, discloses a resonating assembly in an electromechanical filter comprising a plurality of resonating disks. A plurality of long coupling wires attached to the peripheries of all of the disks is provided. The disks are mounted by the plurality of long wires in a parallel spaced relationship. A plurality of short coupling wires are attached to the peripheries of a portion of the disks which are adjacent to the end of the resonating assembly.

U.S. Pat. No. 2,856,588 issued Oct 14, 1958 for a Mechanical Filter, discloses a mechanical filter device comprising a mechanically vibratory input resonator, a mechanically vibratory output resonator, at least one mechanically vibratory direct resonator coupled between the input and the output resonators, and at least one mechanically vibratory contrary resonator coupled between the input and the output resonators. The contrary resonator has a length longer than the length of the direct resonator by an amount substantially equal to an odd integral multiple, including unity of a half wavelength at the resonant frequency of the contrary resonator.

The prior art, particularly in the area of magnetic heads, has not attempted in their several analyses, to find the basic reasons for the presence of distortion components of the modulated signal normally obtained when mixing a carrier or bias signal with intelligence in such a non-linear device as a magnetic core. Consequently, the prior art has not taught ways and means of establishing the basic relationships of the physical parameters constituting a distortion-free magnetic head. In view of lack of sufficient basic investigation, and in an attempt at minimizing recording surface area, prior art magnetic components become complex from both mechanical and electrical considerations, yet fail to eliminate or even minimize phase and/or frequency distortion resulting in such magnetic components.

As a fallout of the disadvantages of the prior art magnetic components, there results in the need for a large quantity of magnetic recording area to record a given amount of intelligence, either in the form of a large amount of tape run at relatively high speed, or disk or drum type recording surfaces, all due to the fact that the major portions of recording area used are occupied by undesired distortion components that accompany the desired intelligence. It can be appreciated that these disadvantages become extremely expensive to bear, when present in computer memory or other storage units wherein close packing of pulses is highly desirable from the standpoint of space saving, speed of transmission of information, ease of storage and retrieval, reduction in time usage of the computer system, and the like.

SUMMARY OF INVENTION

This invention involves a magnetic record or reproduce head wherein a mechanical filter is an integral portion of the magnetic core structure thereof. Both the filtering portion and such portions of the core structure upon which coils are normally positioned, are made of magnetizable material and have magnetic discontinuities constituting the core structure of the head. Such core structure is used for conducting magnetic flux developed by the coils or provided by external recording medium to the head through a high reluctance gap through which such flux is communicated. These discontinuities in effect provide for reduction in distortion components produced by virtue of intermodulation of carrier and intelligence flux components by attenuation of mutual flux components resulting from such intermodulation, when steady-state sinusoidal intelligence is involved. The coils are positioned on core portions which are isolated by such discontinuities to effect a decreased coefficient of coupling between the coils and hence effect a reduction in phase and frequency distortion of the intelligence. In non-sinusoidal intelligence, it was shown by the companion specification, incorporated by reference herein, that excellent performance is achieved with a core devoid of any magnetic discontinuities.

The filtering portions of the head readily provide significant attenuation of harmonic components of the carrier frequency, so that these harmonics and their related distortion components need not be considered as a source of distortion, since the preventative action of this head avoids their presence in the first instance. Several types of mechanical filter structures used most preferably include the disk filter, the dual disk filter, and crystal filters involving quartz, ceramic, ceramic-magnetic or semiconductive material as well as a variety of magnetizable films deposited upon a suitable substrate. It is therefore an object of this invention to provide a magnetic head which sharply attenuates harmonic components of the carrier within the confines of the head structure itself, and to reduce the distortion components of the carrier fundamental to a level wherein this head may be viewed as a distortionless head for either magnetic recording or reproducing purposes.

EXEMPLARY EMBODIMENT

Mechanical Filters in General

In this invention, the basis for the distortionless magnetic head is the mechanical filter. Prior art mechanical filters are disclosed in U.S. Pat. No. 3,440,572, U.S. Pat. No. 3,440,574, U.S. Pat. No. 3,426,300, U.S. Pat. No. 3,439,295 and U.S. Pat. No. 3,135,933. This quoted art reveals that the attenuation poles present just beyond the upper and lower edges of the response curves thereof are created by unique arrangements of diameter mode discs and circle mode discs, conventional coupling wires and bridging wires which function to produce a cancellation of energy at either the upper side or the lower side of the filter passband.

Typical filters of the type described are commercially available having specifications as follows:

| | |
|---|---|
| Center frequency | 455 kHz ± 2kHz |
| Frequency response: | |
| Bandwidth, 6db attenuation | 33kHz ± 1kHz |
| Bandwidth, 60db attenuation | 60kHz maximum |
| Resonating Capacity including circuit | 135 pf ± 20 pf |
| Source and load impedance | 5 47,000 ohms |
| Signal input voltage | 2 volts RMS maximum |
| Outer dimensions including casing | 2 3/16 inches long × 7/16 inches diameter |

Other characteristic specifications of the Disk Mechanical Filter are:

| | |
|---|---|
| Operating Frequency Range | 60–600 kHz. |
| Bandwidth | 0.1 to 10% of Operating Frequency |
| Coupling and Bridging Wires | 0.020 inches diameter or greater |
| Disk Diameter | ½ inch |
| Length of disk stack exclusive of outer casing | 1½ inches |
| Material of Disks, bridging and coupling wires | Nickel-Iron Composition |

A crystal type mechanical filter as is applicable to the instant invention is disclosed in U.S. Pat. No. 3,426,300. An axially supported disk type mechanical filter, as used in conjuction with the head of FIG. 5 herein, is shown and discussed in detail in U.S. Pat. No. 3,351,875.

It becomes apparent that a ceramic such as barium titanate or a semiconductor material such as silicon, germanium, gallium arsenate, etc. can be used in like manner in the inventive magnetic head to be hereinafter described.

The Disk-Type Magnetic Head

Figure 1:
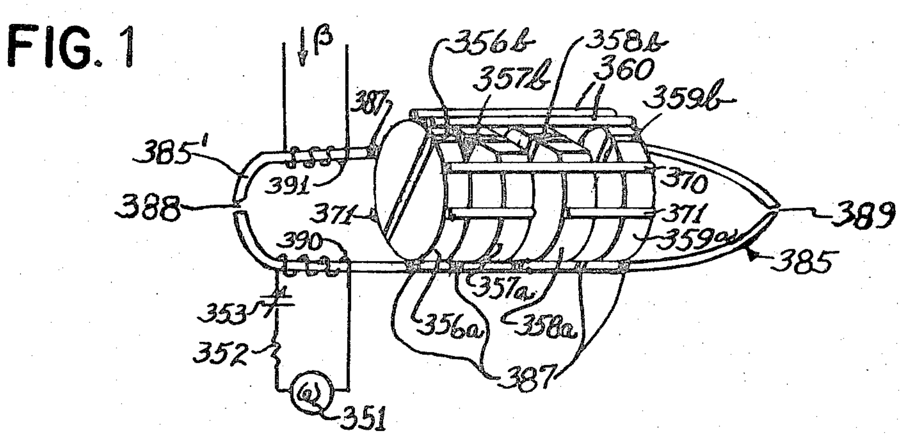
FIG. 1 is a perspective view of one method of providing signal at a distortionless magnetic head in which the concepts of the mechanical filter are embodied.
Figure 2:
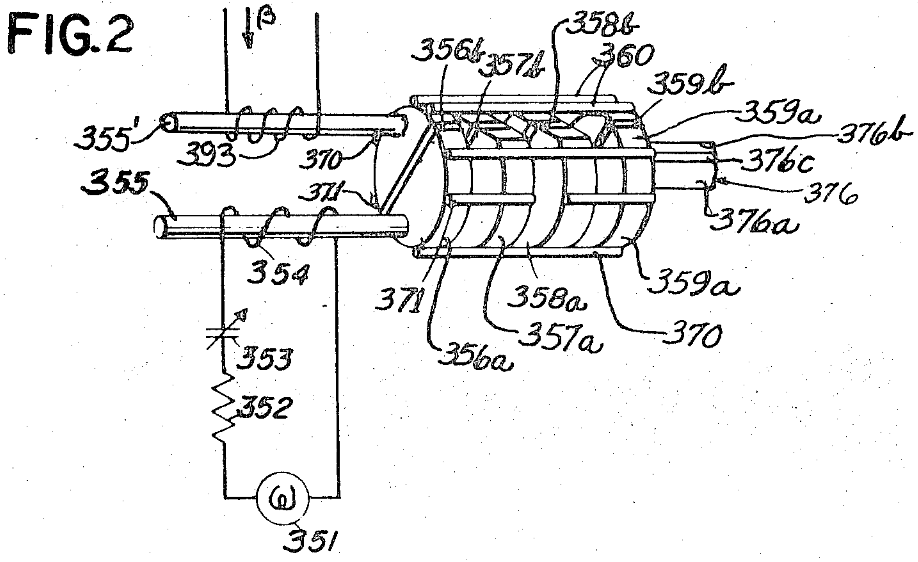
FIG. 2 is a perspective view of another method of providing signal at a distortionless magnetic head in which the concepts of the mechanical filter are embodied.
Figure 3:
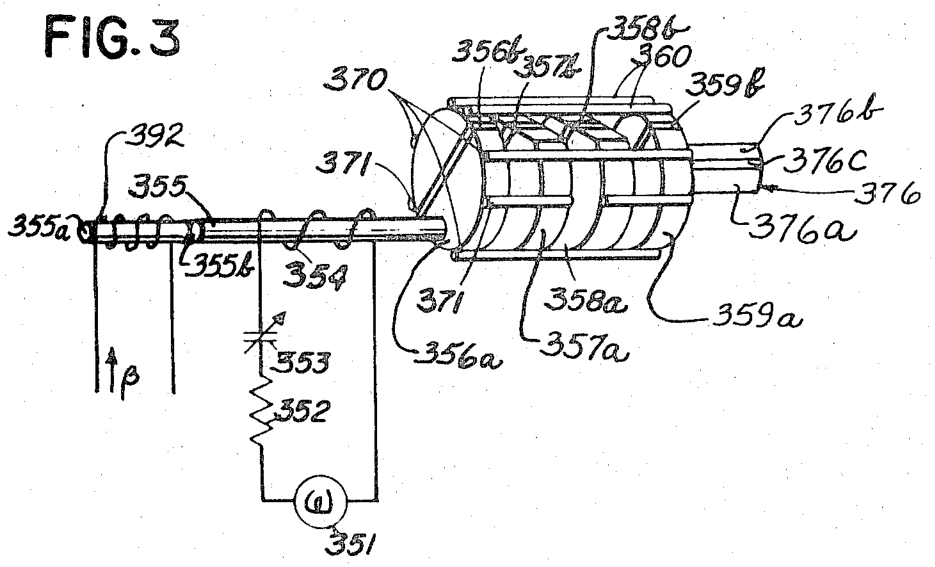
FIG. 3 is a perspective view of a third method of providing signal at a distortionless magnetic head in which the concepts of the mechanical filter are embodied.

Referring to FIGS. 1, 2 and 3 magnetic heads are shown wherein the mechanical filter is an integral portion thereof.

Referring to FIG. 1, the mechanical filter has disks **356*a*, 357*a*, 358*a* and 359*a* each have a non-magnetic material section therein such as copper or other material that is not magnetostrictive in character. Such sections are respectively numbered 356*b*, 357*b*, 358*b*, and 359*b*. Two of the coupling wires identified as members 385 and 385′ in FIG. 1, are located at either side of the disk-assembly, are attached to disks 356*a*, 357*a*, 358*a* and 359*a*, and have magnetic discontinuities 387 therein which may be non-magnetic spacers or gaps, as well as providing air gaps 388 and 389, air gap 389 being used to cooperate with a magnetic medium such as a magnetic tape for enabling magnetic flux bearing intelligence to be imposed thereon or reproduced therefrom. Member 385 has coil 390 wound thereon which is connected to capacitor 353 in series with the equivalent circuit resistance 352 providing energy to the head for causing vibration of disks therein at the preselected frequency of $\omega$ radians per second such as a carrier frequency of 417.5 kilocycles with a 20 kilocycle bandpass. This circuit both acts to vibrate the disk system as well as to carry the intelligence imposed upon coil 391 which is wound on member 385′. The intelligence across the coil, denoted as $\beta$, may be intelligence being injected from external source for modulation with or being carried by frequency $\omega$, or may be intelligence obtained upon reproduction of same from a magnetic tape sensed at gap 389. In the latter instance both the intelligence and the carrier signal will be available across coil 391, and conventional electrical filter circuit discriminating against carrier components and passing intelligence components may be desired at the terminals of coil 391. It should be noted that although the loadings due to members 385 and 385′ and due to inclusion of non-magnetic sections 356*b*–359*b* in the disks, from the pair of coupling wires may cause a change in mode of vibration, compensation therefor is possible by means of change in spacing between disks, by length and thickness of coupling wires 370 and thickness and/or diameter of disks to achieve the same desired response to the bandpass frequencies. Noted also is that part of means 385–385′ and gap 389 provide the magnetic path therein and provide means for sensing or transmitting the magnetic flux through gap 389 from or to a recording means, such as magnetic tape. Also to be noted is that all members of FIG. 1 (as well as of FIGS. 2–6, and excepting for non-magnetic spacers therein) are of magnetostrictive material such as a nickel-iron alloy to provide magnetic flux paths, stability of operation and strength to the structure, and that non-magnetic material such as a copper strip, 356*b*–359*b*, is used to join both halves of each disk providing magnetic discontinuity between each half and reluctance to magnetic flux flowing therebetween. The remaining coupling wires 370, and bridging wires 360, as well as wires 371, also made of nickel-iron material, make electrical connection with their respective half disk, thus avoiding magnetic short-circuit of opposite disk-halves and the main flux will flow in members 385–385′ through as many discontinuities 387 as are required to magnetically decouple coils 390 and 391 (reduce the coefficient of coupling therebetween) so as to attenuate the distortion components normally occurring due to intermodulation products of the carrier and intelligence frequencies in accordance with the theory stated in the patent that was herein incorporated by reference. Of course it may be possible to provide sufficient decoupling of these coils when spacer 388 and gap 389 are appropriately adjusted without the use of spacers 387. It should also be noted that inasmuch as the main core flux path will circulate within members 385 and 385′, representing the equivalent of series components of a filter, shunt flux components will make their way through the paths provided by the disks. Inasmuch as each disk member has a non-magnetic separator, generally of larger spacing than the spacings between the discontinuities in core members 385 and 385′, the magnetic shunt flux flowing through each disk will be substantially less than the flux through core members 385 and 385′. The magnetic flux shunt paths provided thereby can be analogized to the shunt components or shunt legs of an electrical filter. The resultant structure provided is therefore an electrical filter in that the flow of flux being through components to which equivalent inductive and capacitive values can be assigned, and at the same time providing means such as gap 389 at which the flux thereat is communicated to or from a recording medium. The components of the filter being basically passive members, there is no problem in appreciating the bilateral function thereof, namely that bandpass characteristics are realized when either the end thereof at gap 389 or its opposite end are used for either input or output of flux (or visa versa). Another aspect that should be pointed out is the fact that with alternating flux flowing in the main core as well as in the shunt paths, a coil wound on any portion of the core will exhibit a voltage induced therein by Faraday's Law of Induction. Likewise, it will also be appreciated, that since such portion has an equivalent inductive value, a voltage will be induced in the core member proper due to the flow of the magnetic flux therein. Actually, in the mechanical filter mechanical action is implied as performing the filtering function. However, it is pointed out that the mechanical action in the mechanical filter is nothing more than component response to vibrations caused by the force of the frequency $\omega$, wherein the components of the filter are dimensionally sized to respond to such frequency. If a coil is wound on one of these elements or on an element attached thereto, there naturally will be a voltage induced in accordance with Faraday's Law. Extending this concept, any electrical component upon which an alternating signal is forced and which is properly sized to resonate responsive thereto, will vibrate in accordance with the frequency imposed thereon. With this in mind, it can be seen that it makes no difference whether a coil is wound on either member 385 or 385' near gap 389 to pick up the signal provided by the combination of frequencies $\omega$ and $\beta$, or if the reluctance character of gap 389 is used to transfer such signal in terms of the flux in such gap and flowing in the equivalent inductance of members 385–385'**.

Figure 10:
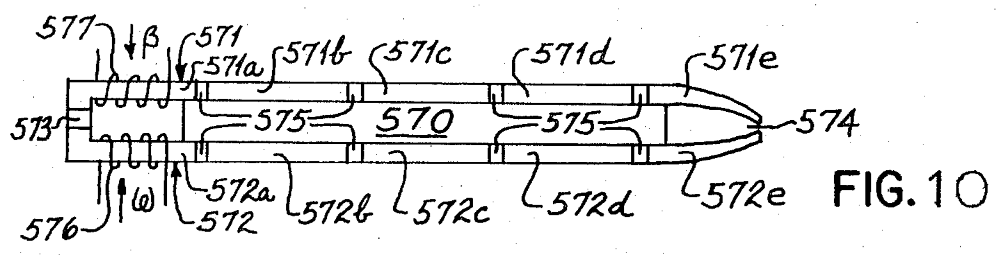
FIG. 10 is an elevation view of a distortionless magnetic head employing certain of the concepts of the mechanical filter.
Figure 11:
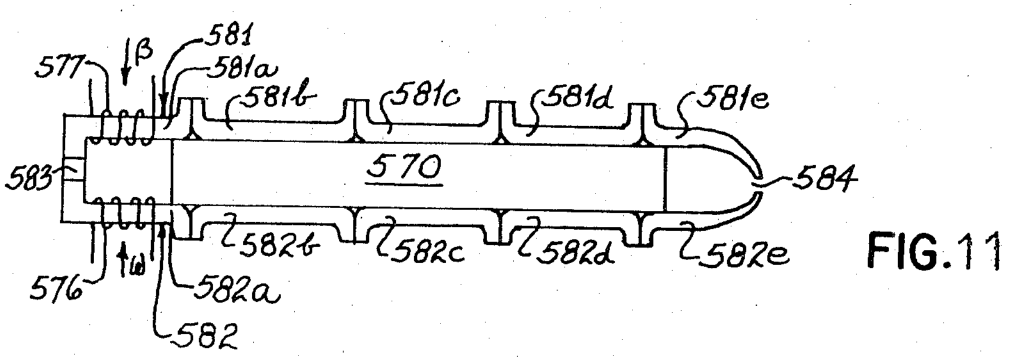
FIG. 11 is an elevation view of a distortioness magnetic head employing certain of the concepts of the mechanical filter.
Figure 12:
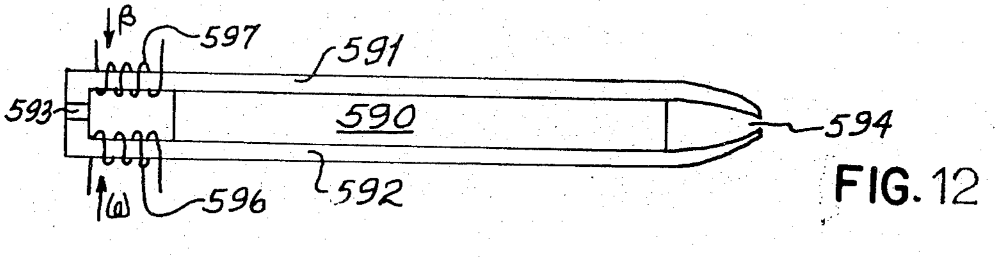
FIG. 12 is an elevation view of a distortionless magnetic head employing the crystal, ceramic or semiconductive member as may be used in the mechanical filter, except that core portions which are in contact with the crystal or transducive means thereof are continuous along the major surfaces thereof.
Figure 13:
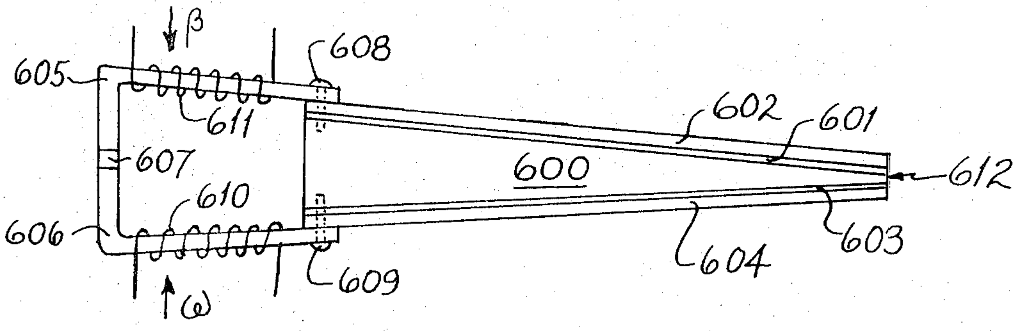
FIG. 13 is an elevation view of a distortionless magnetic head employing the crystal, ceramic or semiconductive member as may be used in the mechanical filter and constitutes a tapered variation of magnetic head as described in connection with FIG. 12.

This criteria applies to all configurations described in this specification wherein a mechanicl filter is an integral portion of the magnetic head structure, excepting that for FIGS. 1–6 the filtering action may be analogized to a lumped parameter filter network, FIGS. 7–11 to a filter network which is in characteristic behavior intermediate between a lumped parameter and a distributive parameter network, and in FIGS. 12–13 which characteristically behaves like a distributive parameter network. The resultant structure would provide the advantages of distortion removal obtained by the method used in the incorporated patent as well as by advantages of filtering action obtainable by a mechanical filter, with resultant intelligence virtually free of any distortion whatever.

Referring to FIG. 2, the basic concepts for the distortionless head are the same as in the case of FIG. 1, except that herein, members 385 and 385' are not used. In their stead, the regular coupling wires 370 are used. End disk 356*a* has connected to the face of one half thereof, magnetostrictive rod 355 on which coil 354 is wound. Coil 354 acts in the same manner as coil 390 of FIG. 1. The other half of disk 356*a* has magnetostrictive rod 355' with coil 393 thereon, and coil 393 acts for the same purpose as coil 391 of FIG. 1. Disk 359*a* has a two-portion magnetostrictive rod comprising portions 376*a* and 376*b* with either a gap or non-magnetic or insulating material at 376*c* separating members 376*a* and 376*b*. Member 376*a* is attached to one half of disk 359*a* and member 376*b* to the other half of disk 359*a*. The result of this configuration yields similar performance as in the case of FIG. 1 but with different structure. The main core flux resulting from flux components of $\omega$ and $\beta$ are provided by the path defined by members 355, one set of disk halves, 376*a*, 376*c*, 376*b*, the other set of disk halves, and member 355'. Coupling between coils 354 and 393 is controlled by the non-magnetic spacing between 376*a* and 376*b* and by non-magnetic spacing members 356*b*–359*b*.

Referring to FIG. 3, the basic configuration as shown in FIG. 2 is used, except for the rod 355'. A non-magnetic spacer 355*b* is attached to the free end of rod 355 to which rod 355*a* is attached. Rod 355*a* is also of magnetostrictive material and has coil 392 would thereon. Coil 392 acts in everyway the same as coil 393 of FIG. 2. As a result the coupling between coils 354 and 392 is more readily controlled by spacer 355*b* thickness, but may also be controlled by the spacing between members 376*a* and 376*b*, namely by the thickness of non-magnetic member 376*c* or simply by an air gap represented by 376*c*. The magnetic flux path then will be through members 355*a*, 355*b*, 355, one half of the disks set, 376*a*, 376*c*, 376*b* and the other half of the disk set.

Figure 4:
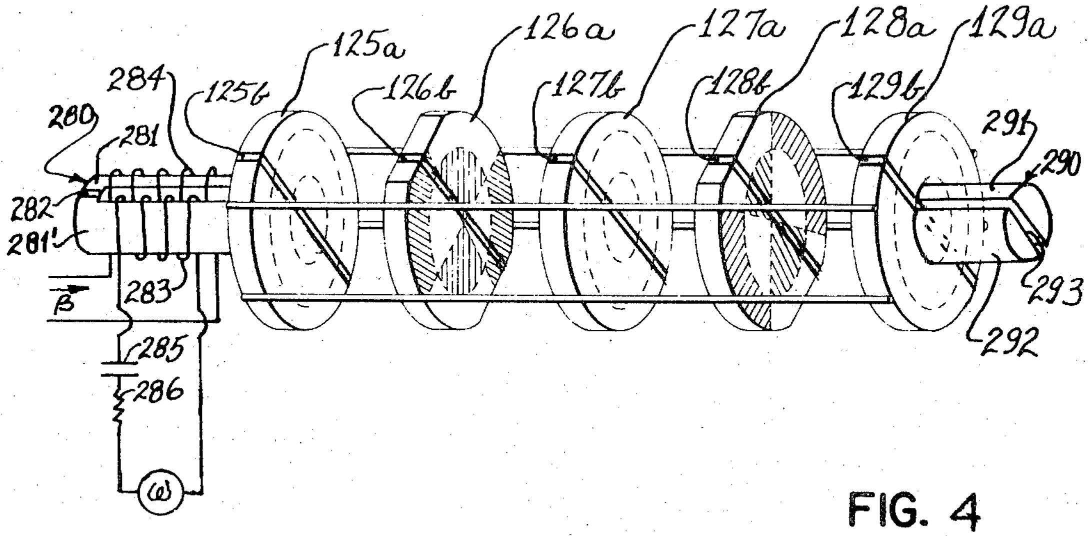
FIG. 4 is a perspective view of a distortionless magnetic head in which the concepts of the mechanical filter are embodied.

Referring to FIG. 4, it can be seen that this head configuration consists of separating the magnetostrictive disks into two halves by means of non-magnetic separators, so that disk 125*a* has separator 125*b* between each half thereof, disk 126*a* has separator 126*b*, disk 127*a* has separator 127*b*, disk 128*a* has separator 128*b*, and disk 129*a* has separator 129*b*. Attached to disk 125*a*, is a slotted magnetostrictive member 280, having portion 281 attached to one half of the disk and portion 281' to the other half thereof. Non-magnetic separator 282 joins members 281 and 281'. Coil 283 is wound on portion 281' and is connected to the carrier frequency ($\omega$) input through resonating capacitor 285 and circuit resistance 286. Coil 284 is wound on portion 281 and has $\beta$ intelligence signal thereacross. The $\omega$ and $\beta$ symbols are as explained hereinabove in connection with FIG. 1. The recording or sensing means 290 is attached to disk 129*a* and consists of two-half sections of a magnetostrictive shaft 291 and 292 separated by a non-magnetic spacer or air gap, denoted as 293, and thus sensing means is describable in the same manner as sensing means consisting of members, 376*a*, 376*b* and 376*c* was described in connection with with FIG. 2. Hence, in this configuration the head will exhibit its main core path in terms of the flux as flowing through members 281, 281', one half of the disk set, 292, 293, 291, and the other half of the disk set.

Figure 5:
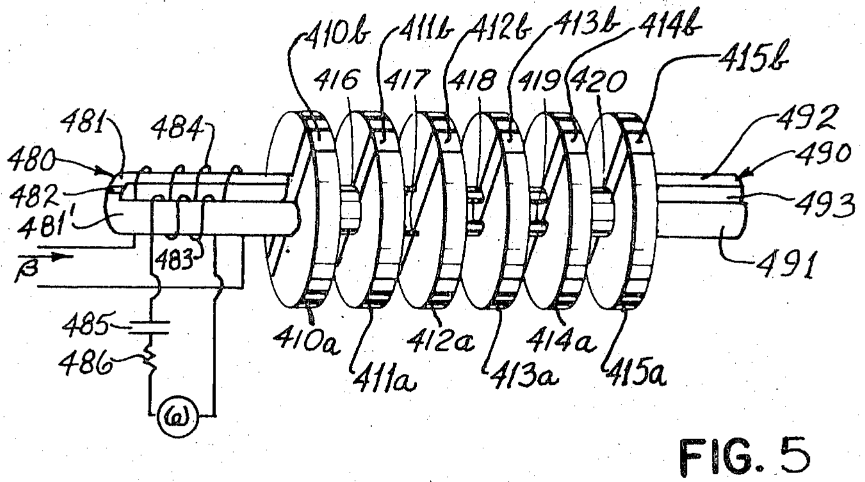
FIG. 5 is a perspective view of a distortionless magnetic head in which the concepts of the mechanical filter are embodied.

Referring to FIG. 5, the filter structure comprises magnetic disk 410a having non-magnetic spacer 410b separating each half, disk 411*a* has non-magnetic spacer 411*b*, disk 412*a* has non-magnetic spacer 412*b*, disk 413*a* has non-magnetic spacer 413*b*, disk 414*a* has non-magnetic spacer 414*b* and disk 415*a* has non-magnetic spacer 415*b* therein. Coupling rings 416–420 being of magnetostrictive material have non-magnetic spacers 416*b*, 417*b*, etc. at opposite ends of their respective diameters, in order to enable spacers 410*b* –415*b* to align therewith and assume magnetic discontinuities between the two half sections of the head. Member 480 is identical to member 280 of FIG. 4 and is connected to disk 410*a* in similar manner as member 280 is connected to disk 125*a*, and is functionally identical therewith. Likewise, member 490 is connected to disk 415*a* and is identical in structure and function to member 290 of FIG. 4. Main core magnetic flux will thusly flow through members 481, 482, 481', one half of disk assembly, through member 491, non-magnetic spacer or air gap 493, member 492, and the other half of the disk assembly. Use of this structure also results in reduction in distortion plug the concepts of sufficiently decoupling the $\omega$ -and-$\beta$-bearing-coils as discussed in the patent that is incorporated herein by reference and mentioned in connection with FIG. 1, above.

Figure 6:
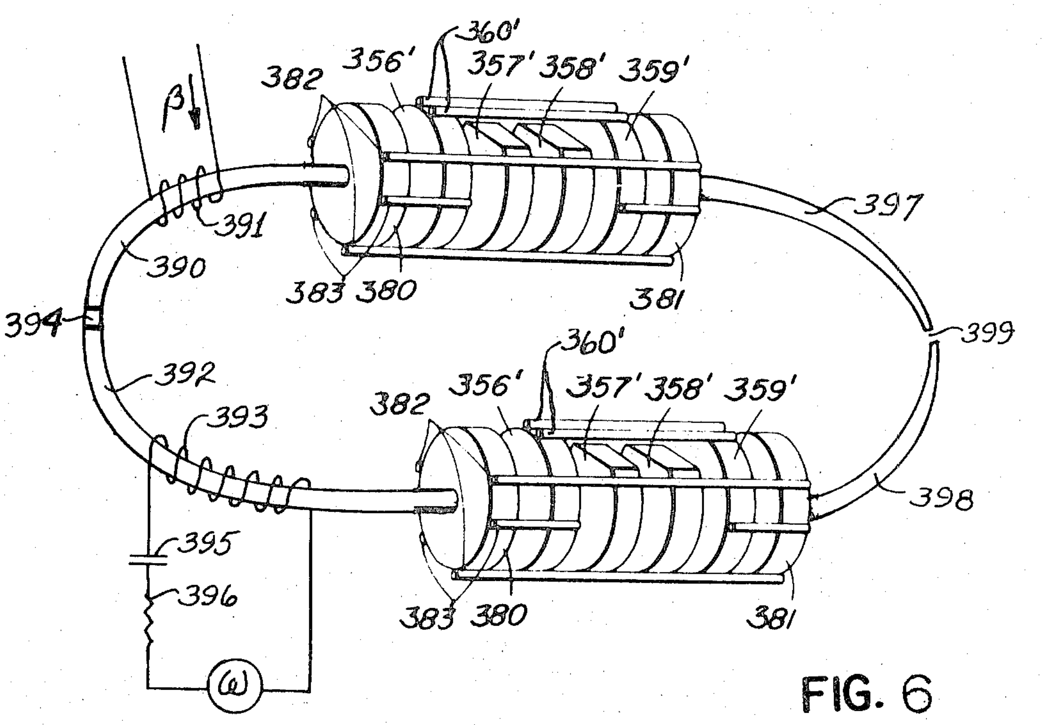
FIG. 6 is a perspective view of a distortioness magnetic head wherein a pair of mechanical filters, are employed.

Referring to FIG. 6 it may be seen that two filter units are employed to comprise the magnetic head in FIG. 6. Hence, magnetostrictive member 390 is attached at one end thereof to the center of nickel-iron disk 380, magnetostrictive member 392 is attached at one end thereof to the center of the other nickel-iron disk 380, and magnetostrictive members 397 and 398 are attached respectively to each of the nickel-iron disks 381 with a gap 399 therebetween for recording or reproducing magnetic flux on or from a recording medium. Members 390 and 392 are joined at their other ends by a non-magnetic spacer 394. All other components of the disk assembly are of magnetostrictive material preferably of nickel-iron composition and perform the same functions as described in connection with FIG. 24. Member 390 has wound thereon coil 391 across which the intelligence identified in terms of $\beta$ radians per second is manifest, whereas member 392 has coil 393 wound thereon which is resonated by means of capacitor 395. Resistance of the circuit is identified as 396, and the carrier and resonating frequency $\omega$, of higher value than $\beta$, is applied to coil 393 through capacitance 395. Members 392 and 390 being physically joined by spacer 394, the vibration imposed upon member 392 will be transmitted to member 390, and hence both filter units will have its members vibrate to the frequency $\omega$ modulated by the frequency $\beta$. Magnetic flux will flow through the system, through member 390, the filter unit attached thereto, through member 397, through air gap 399, through member 398, through the other filter unit, through member 392 and through sapcer 394. This unit will not require its filter disks to be separated by non-magnetic material since the forward and return flux paths are magnetically isolated by virtue of the dual filter unit used.

With respect to FIG. 6, it should be noted that the two mechanical disk filter sections are physically separated from each other by small spacing so as to provide flux paths, of lower orders of magnitude than the flux level in the main core 390–392–397–398, between adjacent disks of each corresponding numbered pair of disks, thereby providing the magnetic shunt paths in the filtering portion of this head.

In all head configurations of FIGS. 1–6, although the filter members may be made of a variety of materials, all components thereof excepting those described hereinabove as non-magnetic, are preferably of nickel-iron magnetizable alloys.

The Crystal, Ceramic or Semiconductive Magnetic Head

Referring to FIGS. 7 through 13, there is shown a number of magnetic heads embodying principles of the crystal filter.

With respect to FIGS. 41 and 42, crystal 550 may be a crystal comb or a ceramic material such as barium titanate or suitable ceramic-magnetic material, or a semiconductive material such as silicon, germanium, gallium, or the like, or mixtures thereof. Whichever material is used we shall herein refer to it as a crystal, to be understood to include ceramics and semiconductors, as opposed to the disk system described in connection with FIGS. 1–6. Magnetic members 551 and 552 are provided respectively at the upper and lower major surfaces of crystal 550. These members have non-magnetic separators 555, 553, and air gap or non-magnetic material at 554, resulting in a magnetic structure with multiple discontinuities therein and segmentary portions 551*a*, 551*b*, 551*c*, 551*d*, 551*e*, 551*f*, 551*g*, 551*h* and 551*i*, as well as segmentary portions 552*a*, *552b*, 552*c*, 552*d*, 552*e*, 552*f*, 552*g*, 552*h* and 552*i*. Each of these portions ranging from 551*b* to 551*h* are progressively smaller in area and similary their respective counterparts 552*b* to 552*h*. Coil 556 is wound on core portion 552*a* and the carrier and vibrating frequency $\omega$ is injected thereat. Coil 557 is wound on core portion 551*a* and intelligence, identified in terms of frequency $\beta$, is applied across this coil, or if acting as a reproduce head is the coil used at which intelligence output may be transferred to an external circuit. In view of the presence of $\omega$ carrier during the reproduce mode, it may be desirable to use a conventional electronic filter at the terminals of coil 557, passing only the intelligence bands and rejecting the carrier or filter excitation frequency $\omega$. However, such conventional filter would not be needed if the system were for example an audio transducer, the amplifier and transducer itself being discriminatory to all frequencies except those in the conventional audio frequency band. Core portions 551*i* and 552*i* form gap 554 through which the the magnetic flux due to $\omega$ and $\beta$ flowing in core 551–552 through all the magnetic discontinuities, is transferred to a recording medium for the recording mode, or sensed from the recording medium for the reproduction mode. The advantages of magnetic discontinuities herein are two-fold. Firstly, they provide the decoupling between coils 556 and 557 to reduce intermodulation distortion as described in the patent which is incorporated herein by reference, and secondly, they provide the spacing between the plates necessary to obtain the filtering action.

It should however be pointed out that, either in the magnetic head employing either crystal or disk type mechanical filtering, during reproduction mode, the head may also be used in that mode without coil to which $\omega$ frequency is applied. In such instance, once the recording has taken place utilizing one of the inventive heads with filtering action, in can be reasoned that the distortion components have not been recorded on the recording medium, and hence use of any of the head configurations will fall in the category of heads described in the patent that was incorporated herein by reference. There being substantially no distortion components recorded, the head will not require to provide filtering action, as it will pass only desired components of $\beta$ modulating the carrier frequency $\omega$. Of course, wherein recording has taken place with distortion, this head when using coil 556 activated by $\omega$ will serve to discriminate against the undesired distortion components previously recorded and providing only a carrier modulated by the desired signal across the terminals of coil 557.

Figures 7, 8:
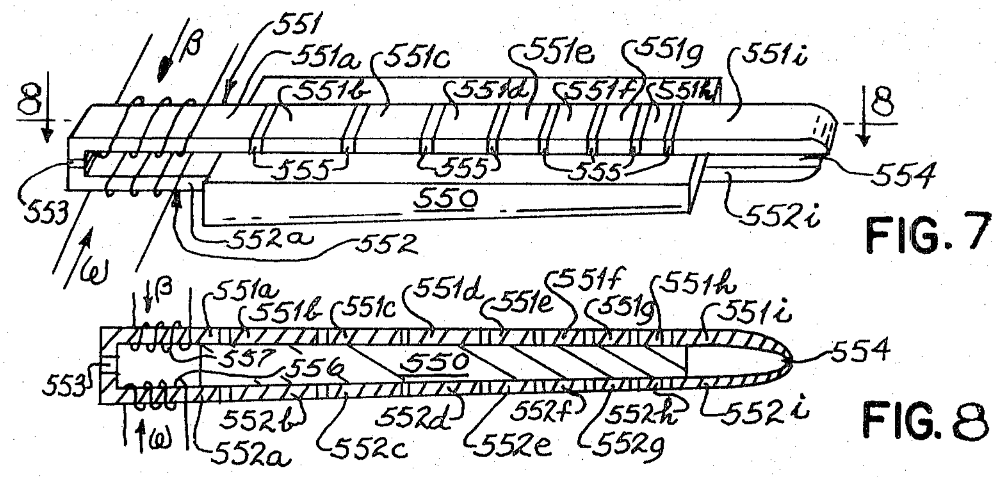
FIG. 7 is a perspective view of a distortionless magnetic head employing the concepts of the mechanical filter.
FIG. 8 is a cross-section view taken along plane 8-8 of FIG. 7.
Figure 9:
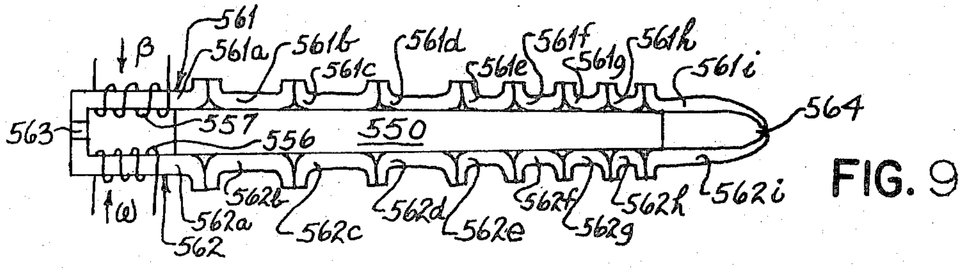
FIG. 9 is an elevation view of a distortionless magnetic head employing the concepts of the mechanical filter.

Referring to FIG. 9, this magnetic head configuration is similar to the head of FIGS. 7-8 except that the magnetic core members 561 and 562 replace respectively core members 551 and 552. In such magnetic core members, U-shaped portions 561*b* to 561*h* replace portions 551*b* to 551*h*, respectively, portion 561*a* replaces portion 551*a*, portion 562*a* replaces portion 552*a*, and portions 561*a* and 562*a* are joined by non-magnetic spacer 563. Core portions forming gap communication means 564 consist of core portions 561*i* and 562*i*, and coil 556 wound on core portion 562*a* is magnetically decoupled from coil 557 which is wound on core portion 561*a*. Frequencies of $\omega$ and $\beta$ are respectively present at coils 556 and 557 in the same manner as described in connection with FIGS. 7–8. Herein, the segmentary core portions are of decreasing area, that cooperate with crystal 550, have magnetic discontinuities therein by virtue of the end portions of the U-shaped members abutting each other, thereby introducing more reluctance at those abutting areas than if the core portions 561 and 562 would have been continuous. Crystal 550 may be of quartz, a ceramic-magnetic material or a semiconductor material. Magnetic flux whether in the recording or reproduce mode, is available at 564, being provided by frequencies $\omega$ and $\beta$ circulating in core portions 561*a* –561*i*, gap 564, core portions 562*a*–562*i* and through non-magnetic separator 563. It is noted in this instance the crystal filter begins to behave more like a smooth transmission line having requisite bandpass characteristics.

Referring to FIG. 10, this configuration is similar to configuration of FIGS. 7–8 except that core members 571 and 572 in cooperation with their respective upper and lower surfaces of crystal 570 form the core structure through which magnetic flux circulates due to the presence and interaction of the $\omega$ and $\beta$ frequency components. Herein, the core portions 571*b* to 571*d*, and corresponding core portions 572*b* to 572*d* form the filter section regions of crystal 570. Crystal 570 may be of quartz, of ceramicmagnetic material or of semiconductive material. Magnetic discontinuities in the core structure are provided by virtue of discontinuities 575, which may be filled with non-magnetic material, discontinuity at 573 which may be a non-magnetic spacer, and discontinuity 574 which may be an air gap at which point magnetic flux is transferred between the head and the recording medium. Core portion 572*a* has coil 576 wound thereon and same is used to provide the carrier or excitation frequency of the head-filter, while similarly, core portion 571*a* has coil 577 wound thereon and used to either provide, or be an output winding of the intelligence frequency component $\beta$ or that component modulating the carrier frequency $\omega$, as hereinabove described. Members 571*e* and 572*e* form the air gap at 574, at which point the flux circulating in core 571–572 is transferred between the head and external magnetic recording medium.

Referring to FIG. 11, this configuration is similar to configuration of FIG. 10, excepting for the core portions of members 581 and 582 being U-shaped and abutting each other, and the coil-bearing-portions 581*a* and 582*a* abutting core portions 581*b* and 582*b* respectively, and portions 581*a* and 582*a* bearing coils 577 and 576 respectively, across which coils frequencies $\beta$ and $\omega$ are imposed in accordance with manner described in connection with FIG. 9. Core portions 581*a* and 582*a* are joined by nonmagnetic spacer 583, and gap 584 is formed between free ends of core portions 581*e* and 582*e*. The flux circulating in core 581–582 circulates through core portions 582*a*–582*e*, gap 584, core portions 581*a*–581*e*, and through non-magnetic spacer 583 which provide the requisite magnetic discontinuities in the core structure for achieving reduction in distortion components as described in the patent incorporated herein by reference, as well as obtaining the advantages of mechanical filter action. Crystal 570 therein may be of quartz material, ceramic-magnetic material or a semiconductive material.

Referring to FIG. 12, this configuration structurally resembling FIG. 10, except for the magnetic discontinuities in the core section which are absent therein, except at 593 where a non-magnetic spacer is used to physically join core portion 591 with core portion 592. The end of portions 591 and 592 are arc-shaped to provide an air gap at 594 at which point magnetic flux is transferred between the head and the magnetic recording medium (not shown). The other ends of core portions 591 and 592 are physically joined by non-magnetic spacer 593, the spacer 593 and the gap 594 together providing the requisite isolation between coils 597 and 596 respectively wound on core portion 591 and 592 near spacer 593, and providing the necessary decoupling or the coefficient of coupling that will minimize the distortion components produced or reproduced by the head without attenuating the desired intelligence components, in accordance with the findings in the patent which is incorporated herein by reference. Operationally, this structure will function in a manner similar to that of the configuration of FIG. 11, except the filtering action that will ensue will more closely resemble smooth or distributive parameter filtering, inherent in view of the cooperation of magnetic components 591 and 592 with the surfaces of crystal means 590, which crystal means may be an actual quartz crystal of a variety of cuts, a ceramic material or a ceramic-magnetic material or a suitable semiconductive material. The lossy character of the semiconductive material functioning as a crystal means 590 will offer greatest resemblance to the transmission line shunt conductive and capacitive components, whereas the non-segmented magnetic core structure 591–592 will provide the inductive-resistive series components thereof, and with particular advantages that might be gained in filtering action when the carrier frequency $\omega$ is sufficiently high, such as 10 megacycles. If desired, a thin oxide film, such as silicon dioxide on the upper and lower surfaces of crystal 590 (not shown), may be grown wherever the crystal means 590 is a semiconductor, such as silicon, in order to avoid too much electrical conductivity across the major crystal surfaces.

Referring to FIG. 13, this configuration resembles most closely the configuration of FIG. 12 in structure as well as function, and generally satisfies the theory relating to filtering action. This magnetic head is composed of semiconductive material 600 generally of wedge-shape in order to exhibit a wide band frequency response with filtering action at the lower frequencies at the thickest portion and at the higher frequencies at the thinnest portion. This crystal will therefore be made to vibrate as a whole and in parts when the carrier or forcing frequency $\omega$ is used to excite this crystal. The upper face of crystal 600 may have a thin insulating oxide film such as a silicon oxide 601 there on and a film of magnetic material 602 may be grown or otherwise deposited over the surface of film 601. Similarly, an insulating oxide film 603 may be deposited on the lower surface of the crystal and a magnetic film 604 similar to film 602 may be deposited over film 603.

Magnetic member 605 has an end thereof attached to magnetic member 606 by means of non-magnetic spacer 607, and the free ends of the resulting U-shaped member 605-607-606 are respectively attached to the surfaces of films 602 and 604 by means of electrodeposition or by mechanical means 608 and 609. Coil 610 bearing carrier frequency $\omega$ is wound on core portion 606, while coil 611, bearing intelligence frequency $\beta$ along with same carrier component, is wound on core portion 605. Film 602, core portions 605 and 606, and film 604 constitutes the magnetic core of this head, with spacers 607, and the narrow junction point at 612 comprising the ends of the crystal structure, and films 602 and 604, and the end of semiconductor crystal 600, constituting the equivalent of the gap means, at 612, at which point the magnetic flux due to $\omega$ and $\beta$ circulating in the core structure is transferred between the core structure and the external recording medium such as magnetic tape. There are, of course, the magnetic discontinuities prevalent by virtue of the junctions at 608 and 609 of the magnetic film and the respective core portions 605 and 606. Excepting for such considerations as were discussed in connection with FIG. 12, this configuration obeys the basic filtering action and also takes into consideration the advantages gained by reduction of the coefficient of coupling between coils 610 and 611 in accordance with the patent which was incorporated herein by reference. In connection with this configuration, various materials besides nickel-iron, or iron alloys may be used to make the films 602 and 604. These materials are of the formulation $R_1$-$R_2$-Oxide, wherein $R_1$ is at least one element selected from the group consisting of nickel, cerium, praseodyonium, neodymium, promethium, samarium, europium, gadolinium, terbium, dysprosium, holmium, erbium, yttrium, thulium, lanthanum, ytterbium, and lutetium, and $R_2$ is at least one element selected from the group consisting of iron, manganese, chromium, vanadium, aluminum, titanium, indium, gallium, and scandium.

It should also be observed, that crystal means 600 and its coatings 601 and 603, and films 602 and 604, may be extended to form on or in film coatings 602 and 604 coils 610 and 611, maintaining as an insulation band an insulating coating in lieu of member 607. This may be accomplished by integrated and solid state techniques well known in the art. In this way, there would be no need for using a separate core structure comprising members 605, 607 and 606 nor means 608 and 609 for attaching same to crystalbearing structure, the end result being that the inductances 611 and 610 will be formed from part of films 602 and 604.

Mechanical to Electrical Filter Analog

It should be apparent, that in all configurations of the magnetic head of FIGS. 1–13 which have been illustrated have been provided with magnetic paths in which the main core fluxes resulting from $\omega$ and $\beta$ will flow, and in which intermodulation of these frequencies will occur with provisions for a higher reluctance area in the system introduced by means of an air gap or non-magnetic material therein through which transfer of the flux to and from a magnetic medium can be made for recording or reproducing of intelligence. It should likewise be apparent that the mechanical filter apparatus normally providing sharp discrimination against unwanted frequencies now becomes a part of the head, passing the desired frequency group and rejecting all others. In the configurations of FIGS. 1–6, such filtering action may be analogized to a lumped parameter transmission line, whereas FIGS. 7–11 may be analogized to have components intermediate a lumped parameter transmission line and a distributive parameter line, and FIGS. 12–13 configuration may be analogized to having filter components equivalent to a distributive parameter transmission line, all properly terminated, to pass the desired signals and rejecting the bands wider than the desired bandwidths and outside of the bandpass limits.

Magnetic Head Having Core Structures Without Magnetic Discontinuities and
Mechanical Filter Sections Integral Therewith Reference is further made to the various figures showing the structural and schematic configurations of the heads for obtaining distortionless magnetic components subject to either sinusoidal carrier-modulated intelligence or non-sinusoidal carrier-modulated intelligence. Non-sinusoidal carrier-modulated intelligence is herein defined as any type of intelligence signal modulating a carrier signal, which intelligence signal whose function has an argument that is not a pure sine or cosine function. As such, non-sinusoidal intelligence would include speech, music, pulse type signals, and other signals generally termed as transient signals.

Particular attention is directed to the core structures in these figures, and it should be noted that these core structures, to be hereinafter in other sections of this specification, described in detail in conjunction with the particular configuration treated, are substantially of homogeneous magnetizable material, or differently stated, have no magnetic discontinuities therein. A magnetic recording or reproduce head is contemplated with core structures thereof devoid of conventional air gaps or magnetic discontinuities of any kind, even at the transflux location of the core for conveying intelligence. It should be noted that these cores are tapered, with narrowing at the tips or reduced cross-sectional area thereof, at which point transfer of the recorded or reproduced modulated flux between an external recording medium and the core occurs. Although a tapered portion is used to obtain concentration of the flux components circulating within the core at such tip, and hence more efficient transfer of flux between the external recording medium and the core, such tapered tip is not absolutely necessary. As will be stated shortly, transfer of flux between the core and the external recording medium such as a magnetic tape, can occur at any location of the core, but of course at lesser efficiency than at a tapered portion, since at a tapered portion a greater amount of flux per unit area will be available for such transfer.

To understand this phenomena, appreciation must be entertained of the voids existing in electromagnetic theory as published by most authors of this subject. Almost 75 years ago, the mathematical and electromagnetic genius of Oliver Heaviside recognized these voids and published a lengthy treatise. This treatise was republished in abridged form, the particular area of applicability to the subject matter of this specification being given as follows:

In the treatise on Electromagnetic Theory by Oliver Heaviside, abridged version of Volumes I, II and III of the complete treatise, published in 1950 by Dover Publications Incorporated of New York, N.Y., this renowned mathematician and scientist points out several incomplete aspects in the works of James Clerk Maxwell. Chapter II, pages 6–32 of the abridged treatise is of special significance in comprehending the theoretical behavior of electromagnetic fluxes and fields, and currents that produce them. Heaviside points out that in considering electromagnetic phenomena, Maxwell considered conductive and displacement currents and fields but stopped short at that point. Hence, it is proven, that Maxwell's equations are incomplete in that they fail to account for continuity of energy in space as well as in time. Of specific interest is Heaviside's treatment of a moving charge, accounting for displacement current, conduction current and electrification of the surface of the body supporting such currents. The electrification occurs by the charges continuing to move through the body, spreading out on the outer surface of the body, as well as the energy due to the moving charges continuing outward away from the outer surface, which outwardly moving energy he calls convection currents or fluxes. Heaviside also points out that the convection current is the missing component of flux or field accounting for the transfer of energy in space. In similar manner Heaviside emphasizes the importance of electromagnetic convection fluxes and relates them to the conduction and displacement currents in the metallic bodies which support them, and which bodies are electrified.

Consideration is given to the conveyance of the energy flux from the electrified body and the electromagnetic forces of fields thereby created, with consideration also given to the effects of a moving medium.

The relevence of this treatise to the instant specification is that it renders support to the concept expounded herein that in order to transfer electromagnetic energy created in a magnetic device to an external magnetic medium such as a magnetic tape, it is not necessary to have a magnetic discontinuity or gap in the core of such device. The fluxes created by the energy in the coils on the magnetizable core, are transferred to the magnetizable core wherein a flux is conducted, displaced to the surfaces of the core, the surfaces becoming electrified, and convection flux energy transferred outwardly from the core. It will therefore be possible to obtain good recording of such flux from any part of the core, but since a given amount of energy is spread over the entire surface area of the core and moving thereover, a greater concentration of the convected or conveyed energy will occur in terms of flux per unit area or volume, at a narrowed portion of the core. With this in mind, the advantage of narrowing the core at its recording tip will be realized in terms of the concentrated amount of flux available at such tip, or conversely for reproducing same from energy already recorded on external magnetic tape.

Other advantages of non-discontinuous or gapless cores with respect to reduction in distortion of the non-sinusoidal intelligence and the magnitude of certain types of non-sinusoidal intelligence, will become evident in further discussion in other sections of this specification.

Referring to FIGS. 14–19 these figures show structural changes to FIGS. 1–6, where in most instances the magnetizable core material is homogeneous and devoid of magnetic discontinuities therein. Such core structure has been shown in the contemperaneously filed patent application by the same inventive entity, to provide superior performance in terms of high fidelity wave-shape reproduction as well as high output recordation flux.

Figure 14:
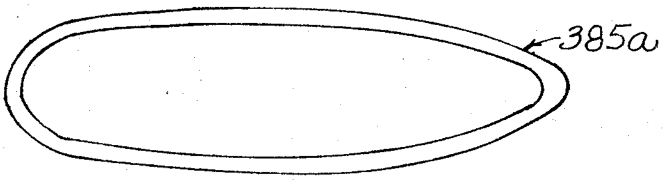
FIG. 14 is an elevation view of a core structure that replaces the core structure of FIG. 1.

Therefore, core structure 385 of FIG. 1 is replaced by core structure 385*a* as shown in FIG. 14. Core 385*a* has no magnetic discontinuities therein and recordation of flux occur by virtue of the convection flux component at the narrowed portion of the core that is contiguous to external recording surface such as magnetic tape. Unity coefficient of coupling between coils 391 and 390 will be possible with substantial attenuation in distortion components.

Figure 15:
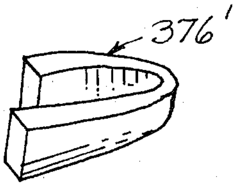
FIG. 15 is a perspective view of a portion of a core structure that replaces an analogous portion of the core structure of FIG. 2.

A portion of the core structure 376 of FIG. 2 is replaced by another core structure portion 376′ as shown in FIG. 15. Core portion 376′ having no magnetic discontinuities will provide maximum convection flux at the narrowed portion of core 376′, and hence improved performance of the structure of FIG. 2 as modified to form the structure shown in FIG. 15.

Figure 16:
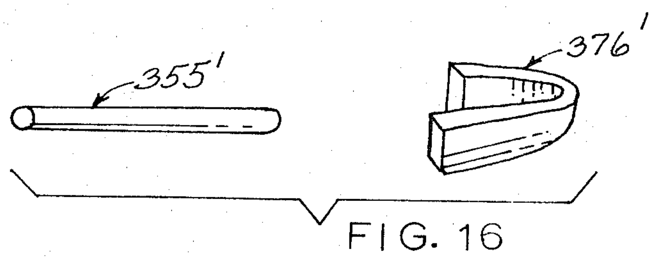
FIG. 16 are perspective views of several core portions used to replace several core portions in the structure of FIG. 3.

The core structure in FIG. 3 is replaced by the structure shown in FIG. 16. FIG. 16 provides for a continous magnetizable rod 355′ upon which the several coils are wound, instead of the two core portions 355 and 355*a* separated by magnetic discontinuity 355*b* as provided in FIG. 3. Also core portion 376 is replaced by core portion 376′ to provide a recording tip without any magnetic discontinuities. Reduction in distortion over the head of FIG. 3 will therefore be experienced by the head of FIG. 16.

Figure 17:
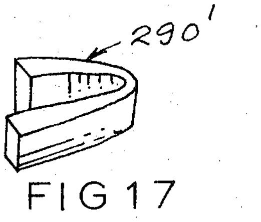
FIG. 17 is a perspective view of a core portion used to replace an analogous core portion of the structure of FIG. 4.

The core structure 290 in FIG. 4 is replaced by the structure 290′ shown in FIG. 17. Such core portion not having magnetic discontinuities at the recording tip will cause further reduction in distortion components over the head shown in FIG. 4.

Figure 18:
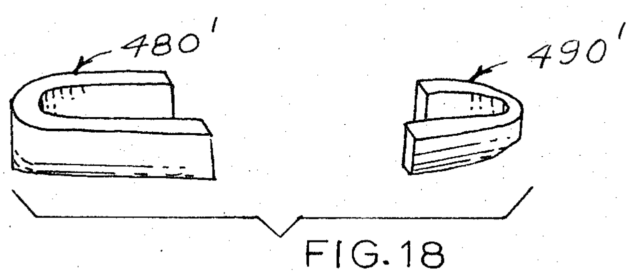
FIG. 18 is a perspective view of several core portions used to replace several analogous core portions of the structure of FIG. 5.

Core portions 480 and 490 of FIG. 5 are replaced by core portions 480′ and 490′ as shown in FIG. 18. The modified core structure herein is substantially devoid of magnetic discontinuities, except those caused by contact of members 416, 417, 418, 419 and 420 with the several disks in the filter section. Reduction of distortion components will equally be experienced herein almost to the extent as experienced in the head of FIG. 14.

Figure 19:
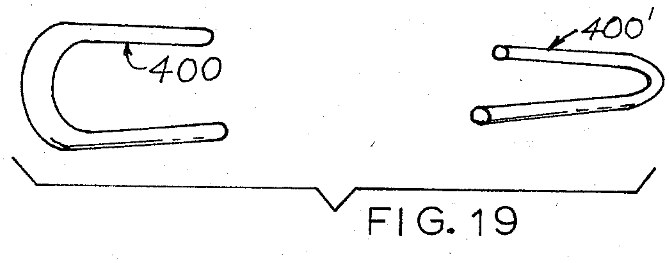
FIG. 19 is a perspective view of several core portions used to replace several analogous core portions of the structure of FIG. 6.

Referring to FIG. 19, core structure 400 replaces core portions 390 and 392 and magnetic discontinuity 394 of FIG. 40. Also core portion 400′ of FIG. 19 replaces core portions 397 and 398 and discontinuity 399 of FIG. 6. The modified head results in forming a non-discontinuous magnetic path through core portions 400, 400′, the disks of the several filter sections and members 382 making connection to such disks will result in an improved head devoid of magnetic discontinuities and yielding optimum performance.

Figure 20:
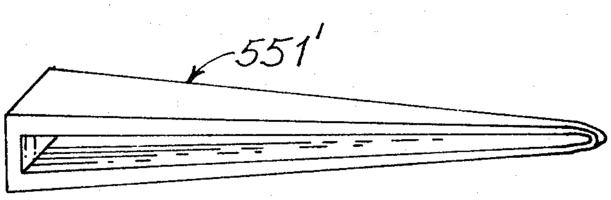
FIG. 20 is a perspective view of a core structure used to replace the analogous core structure of FIG. 7.
Figure 21:
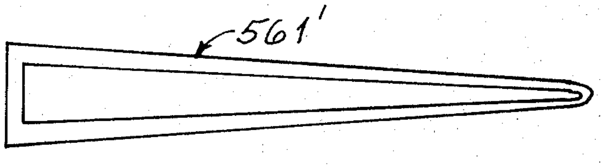
FIG. 21 is an elevation view of a core structure used to replace analogous core structures of FIGS. 8 and 9, and may be used to replace the analogous core structure of FIG. 13.
Figure 22:
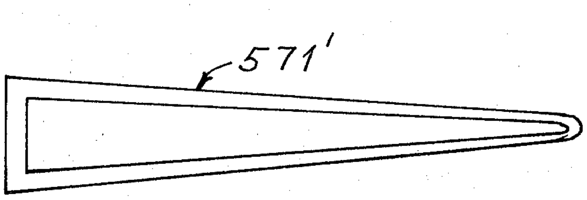
FIG. 22 is an elevation view of a core structure used to replace the analogous core structures of FIGS. 10, 11 and 12, but the crystal or ceramic filter sections used in the modified structure would be tapered to conform to the tapered core structure in FIG. 22.

Referring to FIGS. 20, 21 and 22, these figures show structural changes applied to FIGS. 7–12, to provide a head with a homogeneous magnetizable core structure devoid of magnetic discontinuities therein for operation with a crystal or ceramic filter as an integral portion of the head.

Therefore, core 551 of FIG. 7 is replaced by core 551′ as shown in FIG. 20. Such core is devoid of magnetic discontinuities, and in accordance with the theory developed in the contemperaneously filed patent application, will provide a superior recording head over that of FIG. 7. Recording flux however is provided by the convection flux component at the tapered portion of core 551′.

Referring to FIG. 21, core structure 561′ shown therein is used to replace the core structures of FIGS. 8 and 9. Core 561′ having no magnetic discontinuties therein will provide a convection flux component at the narrowed portion thereof for recording on an external means such as magnetic tape, and provide additional attenuation of distortion components over the structures of FIGS. 8 and 9. Core 561′ may be used to improve the performance of the structure of FIG. 13, by replacing the core thereof with core 561′ so that a head with a semiconductive crystal filter section, without distortion, may be provided.

Referring to FIG. 22, core structure 571′ shown therein is used to replace the core structures of FIGS. 10, 11 and 12. Since the crystal or ceramic filter sections used in FIGS. 10, 11 and 12 are untapered, core structure 571′, can only be tapered and narrowed at one end thereof for flux concentration at its narrowed portion, to obtain the desired convection component of the magnetic flux at such narrowed portion for optimum attenuation of distortion components in the head.

I claim:

1. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
said mechanical filter means comprises:
an array of magnetizable disks excited by said magnetic flux during said recordingg or reproduce mode, said disks being positioned parallel to and spaced apart from each other, each of said disks comprising two half portions;
non-magnetic material joining the half portions of each said disk for providing magnetic discontinuities in each of the disks; and
coupling wires joining the outer peripheries of the disks.

2. The invention as stated in claim 1, wherein said magnetizable core means comprises:
a plurality of core portions with magnetic discontinuities along the length of said core portion.

3. The invention as stated in claim 1, wherein said magnetizable core means comprises:
magnetizable material devoid of magnetic discontinuities, said core means having a narrowed portion for transducing said flux thereat.

4. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
said mechanical filter means comprises:
a plurality of arrays of magnetizable disks excited by said magnetic flux during said recording or reproduce mode, the disks in each of said plurality of arrays being parallel to and spaced apart from each other; and
coupling wires joining the outer peripheries of the disks.

5. The invention as stated in claim 4, wherein said magnetizable core means comprises:
a plurality of core portions with magnetic discontinuities along the length of said core.

6. The invention as stated in cliam 4, wherein said magnetizable core means comprises:
magnetizable material devoid of magnetic discontinuities, said core means having a narrowed portion for transducing said flux thereat.

7. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
said mechanical filter means comprises:
a plurality of magnetizable disks excited by said magnetic flux during said recording or reproduce mode, said disks being positioned parallel to and spaced apart from each other, each of the disks comprising two half portions;
non-magnetic material joining said half portions for providing a magnetic discontinuity between said half portions; and
members with magnetic discontinuities therein, said members being attached to the centers of the disks for maintaining alignment of the discontinuities in the disks with the discontinuities in the members and for providing spacing between said disks.

8. The invention as stated in claim 7, wherein said magnetizable core means comprises:
a plurality of core portions with magnetic discontinuities along the length of said portion.

9. The invention as stated in claim 7, wherein said magnetizable core means comprises:
magnetizable material devoid of magnetic discontinuities, said core means having a narrowed portion for transducing said flux thereat.

10. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
wherein said core means comprises two core portions, and wherein said mechanical filter means comprises a piezoresistive member, positioned between said two core portions and in cooperation with said two core portions, said member being excited by the magnetic flux during said recording or reproduce mode.

11. The invention as stated in claim 10, wherein each of said two core portions has a plurality of magnetic discontinuities along its length.

12. The invention as stated in claim 10, wherein said magnetizable core means comprises:
magnetizable material devoid of magnetic discontinuities, said core means having a narrowed portion for transducing said flux thereat.

13. The invention as stated in claim 10:
said piezoresistive member being a quartz crystal.

14. The invention as stated in claim 10:
said piezoresistive member being a ceramic material.

15. The invention as stated in claim 10:
said piezoresistive member being a semiconductor material.

16. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
wherein said core means comprises two core portions, and wherein said mechanical filter means comprises a semiconductor member in cooperation with and positioned between said two core portions, said member being excited by the magnetic flux during said recording or reproduce mode.

17. The invention as stated in claim 16, wherein each of said two core portions has a plurality of magnetic discontinuities along its length.

18. The invention as stated in claim 16, wherein said magnetizable core means comprises:
magnetizable material devoid of magnetic discontinuities, said core means having a narrowed portion for transducing said flux thereat.

19. The invention as stated in claim 16, including:
an insulating oxide film integral with the semiconductor member and interposed between the semiconductor member and each of the core portions and in cooperation with the core portions.

20. The invention as stated in claim 16, wherein said semiconductor material and magnetizable core means form a tapered structure that is wider at one end of the tapered structure and narrower at the other end thereof for transducing said flux at the narrower end.

21. The invention as stated in claim 16, wherein each of said core portions comprises:
a layer of magnetic composition.

22. The invention as stated in claim 21:
said layers of magnetic composition being an oxide compound having the formulation $R_1$-$R_2$-Oxide, wherein $R_1$ is at least one element selected from the group consisting of nickel, cerium, praseodynium, neodymium, promethium, samarium, europium, gadolinium, terbium, dysprosium, holmium, erbium, yttrium, thulium, lanthanum, ytterbium and lutetium, and $R_2$ is at least one element selected from the group consiting of iron, manganese, chromium, vanadium, aluminum, titanium, indium, gallium and scandium.

23. The invention as stated in claim 21, where said coil means are formed on a portion of at least one of the two layers of magnetic composition.

24. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
the mechanical filter means comprises:
an array of magnetizable planar members excited by said magnetic flux during said recording or reproduce mode, the planar members being positioned parallel to and spaced apart from each other, each of the planar members comprising a plural number of portions; and
non-magnetic members joining the plural number of portions of each of the planar members for providing magnetic discontinuities in each of the planar members, said planar members being joined at their outer peripheries to the core means.

25. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal,
the mechanical filter means comprises:
a plurality of arrays of magnetizable planar members excited by said magnetic flux during said recording or reproduce mode, the planar members being positioned parallel to and spaced apart from each other, each of the planar members comprising a plural mumber of portions; and
non-magnetic members joining the plural number of portions of each of the planar members for providing magnetic discontinuities in each of the planar members, said planar members being joined at their outer peripheries to the core means.

26. A magnetic head, comprising in combination:
magnetizable core means for establishing a principal path for magnetic flux in said head;
coil means integral with the magnetizable core means for providing said magnetic flux during recording mode or for sensing said magnetic flux during reproduce mode; and
mechanical filter means integral with the magnetizable core means for filtering the flux to pass a bandwidth of information and carrier signal while attenuating harmonic components of the carrier signal, the mechanical filter means comprises:

an array of magnetizable planar members excited by said magnetic flux during said recording or reproduce mode, the planar members being positioned parallel to and spaced from each other, each of the planar members comprising a plural number of portions;

non-magnetic members joining the plural number of portions of each of the planar members for providing magnetic discontinuities in each of the planar members; and spacer members, between the centers of the planar members, in cooperation with the surfaces of said planar members providing spacing therebetween, said magnetizable core means having two elongated portions which are each attached to the outer surfaces of the array constituting the planar members at the ends of said array, said elongated portions being positioned substantially at the respective centers of the planar members located at said ends and perpendicular to said ends.

27. A magnetic head, comprising in combination:

magnetizable core means for establishing a principal path for magnetic flux in said head;

coil means integral with the magnetizable core means for providing said magnetic flux during recording mode or for sensing said magnetic flux during reproduce mode; and mechanical filter means integral with the magnetizable core means for filtering the flux to pass a bandwidth of information and carrier signal while attenuating harmonic components of the carrier signal, the mechanical filter means comprises:

an array of magnetizable planar members excited by said magnetic flux during said recording or reproduce mode, the planar members being positioned parallel to and spaced from each other, each of the planar members comprising a plural number of portions;

non-magnetic members joining the plural number of portions of each of the planar members for providing magnetic discontinuities in each of the planar members; and spacer members, between the centers of the planar members, in cooperation with the surfaces of said planar members providing spacing therebetween, said magnetizable core means having two elongated portions which are attached to the outer surfaces of the array constituting the planar members at the ends of said array, one of said elongated portions being positioned off-center with respect to one of the planar members located at one of said ends and the other of said elongated portions being positioned substantially at the center of the planar member located at the other of said ends, both said elongated portions being perpendicular to said ends.

* * * * *

PO-1050
(5/69)

UNITED STATES PATENT OFFICE
CERTIFICATE OF CORRECTION

Patent No. 3,859,665 Dated January 7, 1975

Inventor(s) Martin E. Gerry

It is certified that error appears in the above-identified patent and that said Letters Patent are hereby corrected as shown below:

Claim 1, column 19, line 37 delete "recordingg", substitute -- recording --

Claim 6, column 20, line 12 delete "cliam", substitute -- claim --

Column 7, line 16 delete "547,000 ohms, substitute -- 47,000 ohms --

Column 11, line 5 delete "plug", substitute -- plus --

Column 11, lines 23-25 delete "and perform the same functions as described in connection with FIG. 24"

Column 11, line 41 delete "sapcer", substitute -- spacer --

Column 11, line 63 delete "FIGS. 41 and 42", substitute -- FIGS. 7 and 8 --

Column 18, line 46 delete FIG. 40", substitute -- FIG. 6 --

Signed and sealed this 4th day of March 1975.

(SEAL)
Attest:

RUTH C. MASON
Attesting Officer

C. MARSHALL DANN
Commissioner of Patents
and Trademarks